Figure 5:
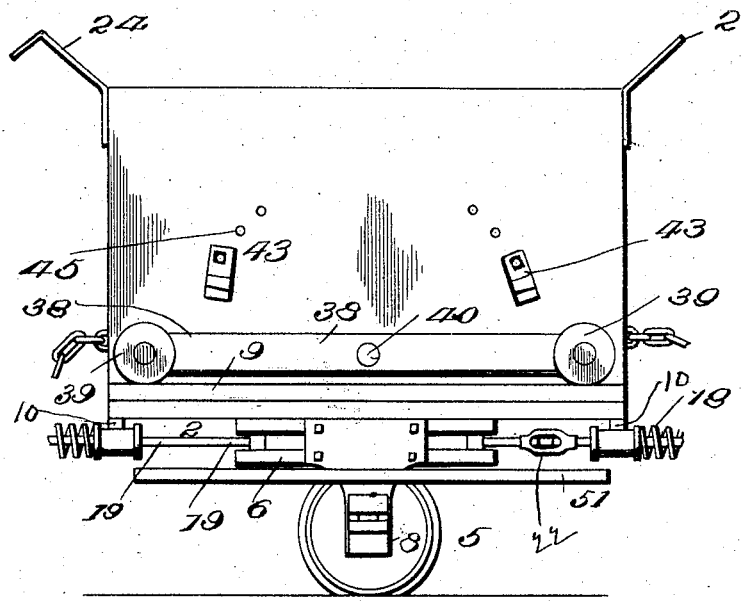

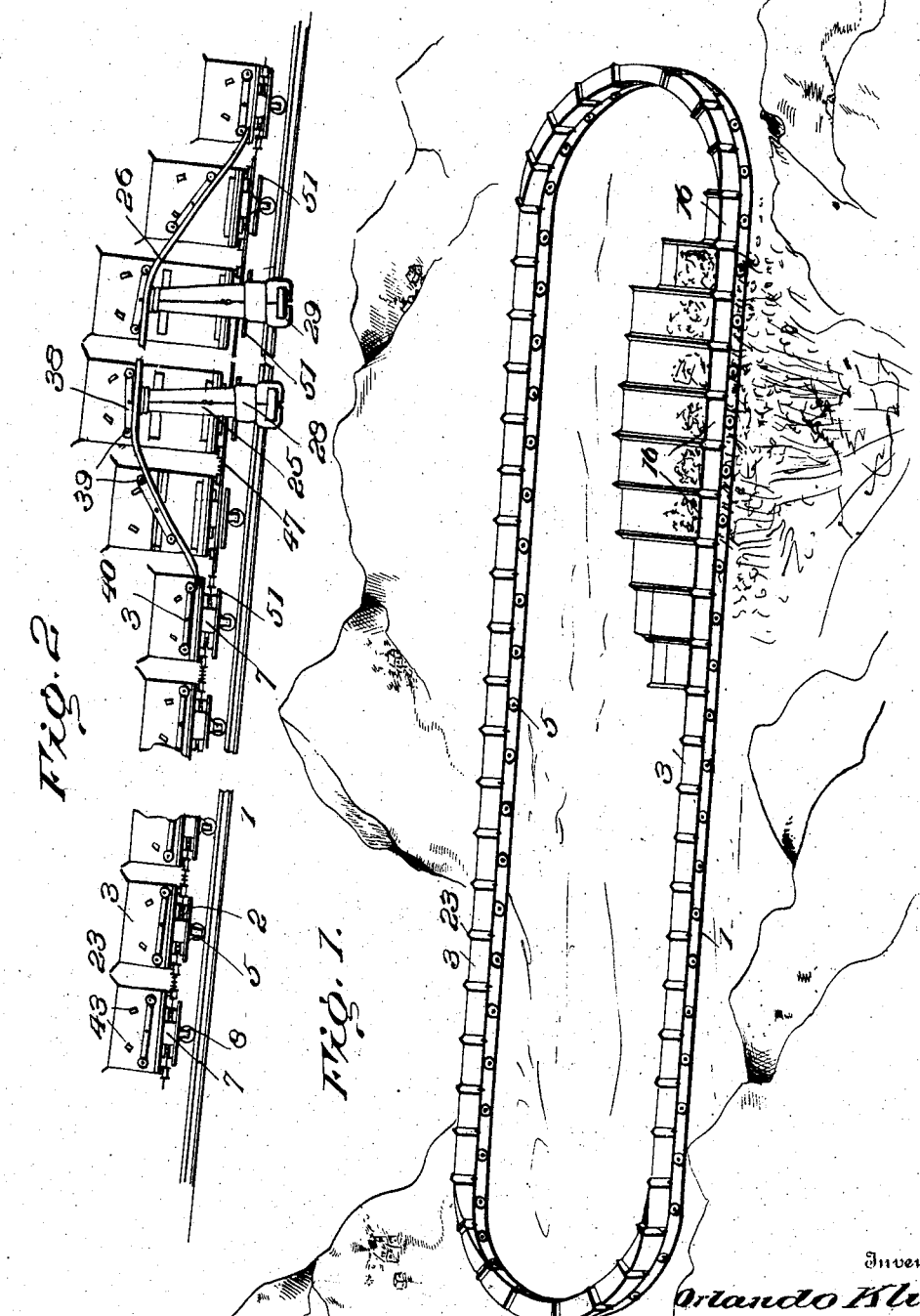

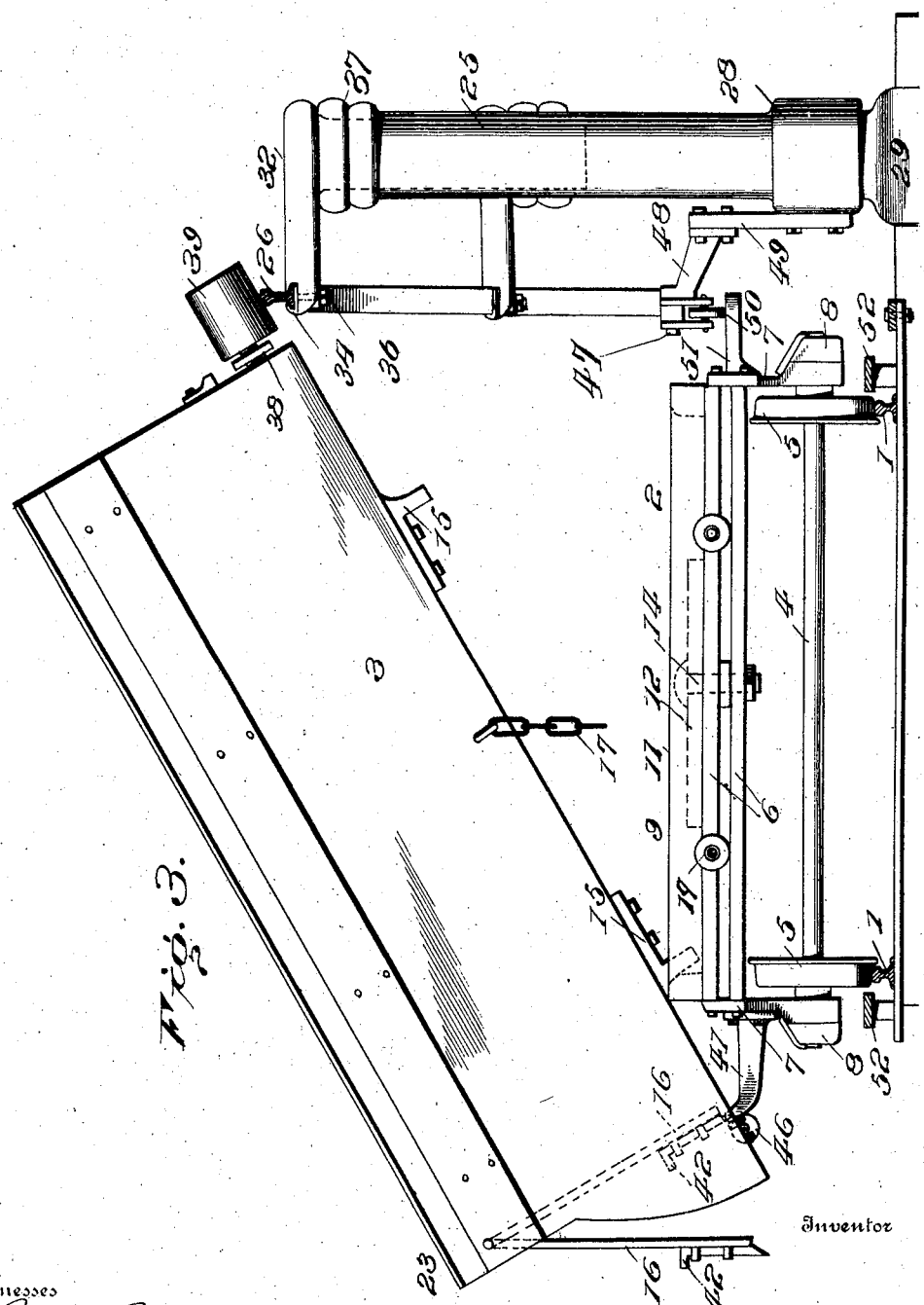

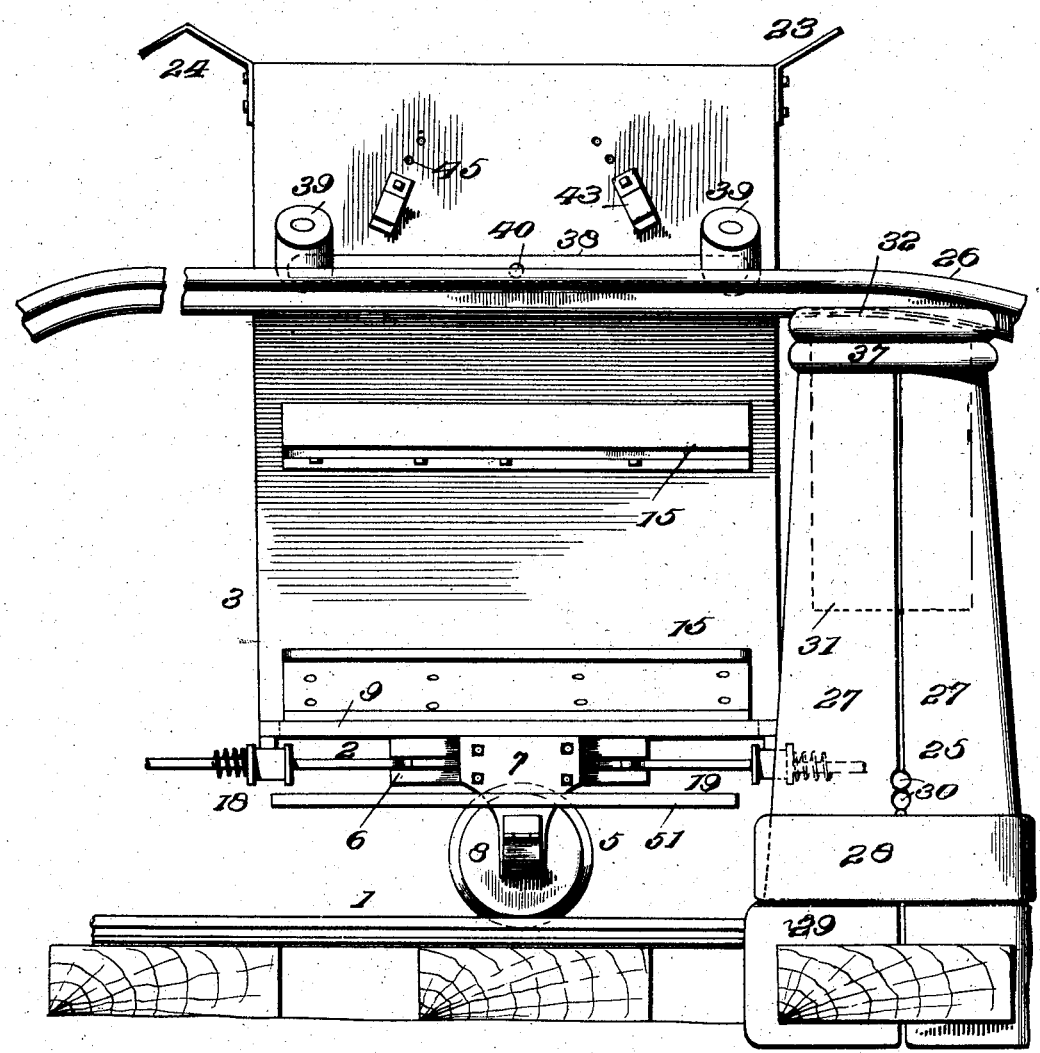

No. 772,569. PATENTED OCT. 18, 1904.
O. KLING.
CONVEYER.
APPLICATION FILED JAN. 25, 1904.
NO MODEL. 5 SHEETS—SHEET 4.

Witnesses
Inventor
Orlando Kling.
By
R. S. & A. B. Lacey, Attorneys

No. 772,569. PATENTED OCT. 18, 1904.
O. KLING.
CONVEYER.
APPLICATION FILED JAN. 25, 1904.
NO MODEL. 5 SHEETS—SHEET 5.
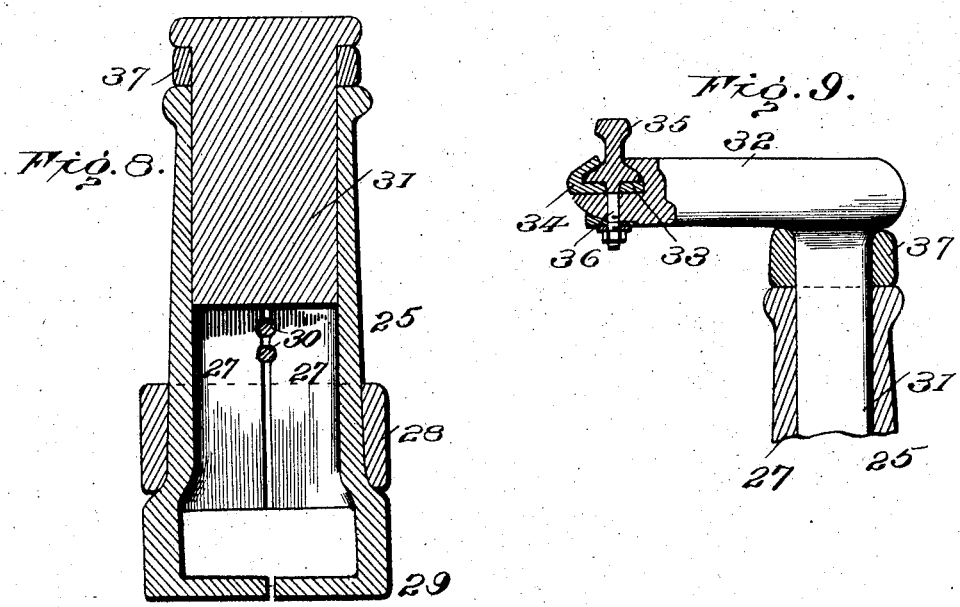
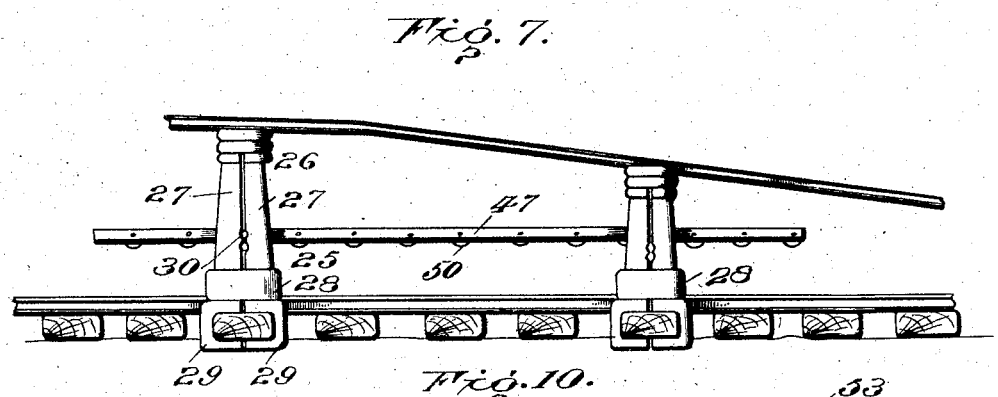
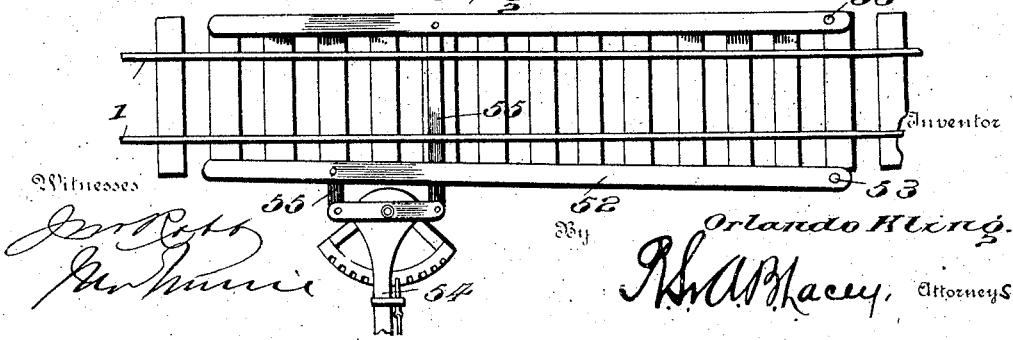
Inventor
Orlando Kling No. 772,569.                                           Patented October 18, 1904.

UNITED STATES PATENT OFFICE.

ORLANDO KLING, OF DENVER, COLORADO, ASSIGNOR OF ONE-HALF TO HERBERT GEORGE, OF SAN FRANCISCO, CALIFORNIA.

CONVEYER.

SPECIFICATION forming part of Letters Patent No. 772,569, dated October 18, 1904.

Application filed January 25, 1904. Serial No. 190,553. (No model.)

*To all whom it may concern:*

Be it known that I, ORLANDO KLING, a citizen of the United States, residing at Denver, in the county of Denver and State of Colorado, have invented certain new and useful Improvements in Conveyers, of which the following is a specification.

This invention relates to a conveying apparatus to be used in connection with large powerful excavating-machines, more especially for transporting earth, rock, or other materials excavated.

The invention provides in its preferred form a gravity-operated carrier, which consists of a train or series of moving receptacles which are adapted to receive the material from the excavating-machine and to automatically dump such material when the conveyer has reached a predetermined point in its travel. Preferably the carrier-receptacles which comprise the conveyer are coupled in an endless train moving upon a circular or elliptical track inclined in its length, the power for moving the train being produced by continuously supplying the material-receptacles, same moving down grade when loaded and being dumped automatically at the predetermined point above mentioned. The point of dumping, or, in other words, the spillway or discharge-point, is located at a lowermost point in the length of the incline upon which the carriers are moved, so that the weight or gravity-pulling force of the loaded cars may readily cause the supply of empty cars to move beneath the loading-chutes, which are disposed adjacent the excavating-machines.

The conveying-receptacles may be supplied with motive power by locomotives or the like within the contemplation of my invention, and it is also designed in certain instances to connect a series of trains to each other by cables, operating them upon similar tracks, in which case the loading-chutes would be constructed to deliver the loads intermittently instead of continuously.

For a full description of the invention and the merits thereof and also to acquire a knowledge of the details of construction of the means for effecting the result reference is to be had to the following description and accompanying drawings.

While the essential and characteristic features of the invention are susceptible of modification, still the preferred embodiment of the invention is illustrated in the accompanying drawings, in which—

Figure 6:
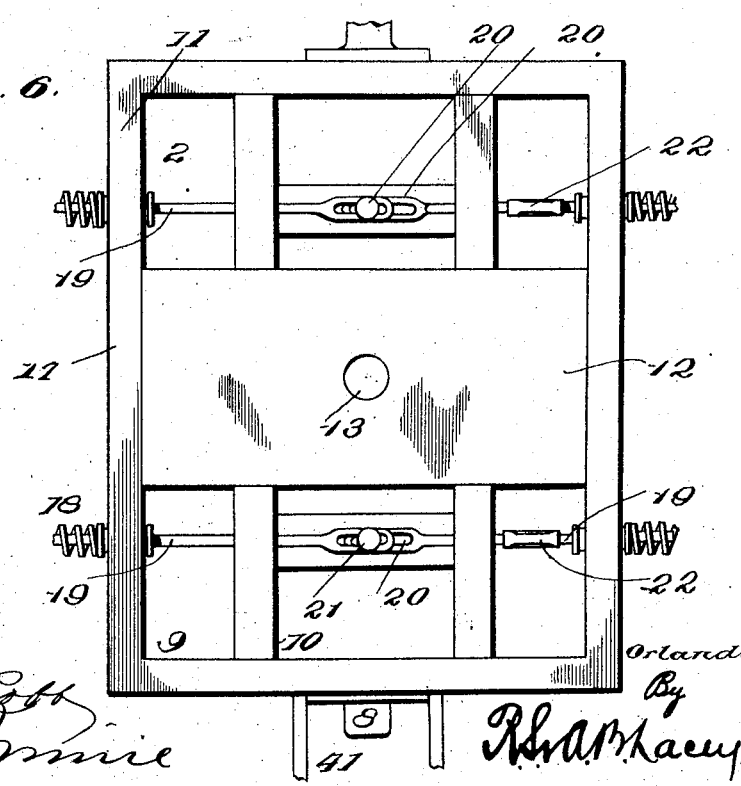

Figure 1 is a perspective view showing the preferred form of the invention as embodied in a gravity-operated traveling conveyer. Fig. 2 is an elevation, parts broken away, showing the manner of dumping the cars. Fig. 3 is a rear elevation of one of the cars which comprise a moving truck and a conveying-receptacle. Fig. 4 is a side elevation enlarged, showing one of the cars with the car-body or material-receptacle in the position assumed when being dumped. Fig. 5 is a side elevation of one of the cars, the car-body being shown in its normal position. Fig. 6 is a plan view of the car-truck, the car-body removed. Fig. 7 is an elevation showing a portion of the track and the manner of mounting the spillway or car-dumping rail. Fig. 8 is a vertical sectional view through one of the spillway-rail-supporting columns. Fig. 9 is a view, parts broken away, showing the upper portion of one of the supporting-columns and the manner of mounting the spillway-rail thereon. Fig. 10 is a plan view illustrating one type of means which may be employed for braking the conveyer.

Corresponding and like parts are referred to in the following description and indicated in all the views of the drawings by the same reference characters.

As very clearly illustrated in Fig. 1 of the drawings, which shows the preferred construction of my invention in the form of a gravity-operated conveyer, the conveyer is arranged to operate at an angle to the cut or work and is particularly designed for operation in hilly or mountainous country. The excavating-machines are of course located in the cut, and chutes or the like are provided to direct a continuous stream of excavated material into the receptacles or car-bodies carried by the conveyer-train. The conveyer-train, as will be seen, moves upon a suitable track 1, which is inclined, and the point of supply of the material to be conveyed is higher than the point of discharge. The point of supply is adjacent the cut which is being excavated, and the point of discharge is near the lower portion of the inclined track 1, the above enabling the use of the gravity motive power, as has been before premised upon.

The conveyer comprises a series of connected cars, which consist of a truck 2 and a car-body 3, mounted upon the truck 2, the latter comprising the receptacle which carries the material excavated. It is preferred that the truck 2 be mounted upon a single axle 4, which is supported upon the wheels 5 in the usual manner in order to give a maximum amount of flexibility to the train of receptacles, for reasons which will appear as the description proceeds. The truck 2 comprises transverse bed-plates 6, disposed one above the other, from which plates 6 depend the standards 7, which are provided with journal-boxes 8 to receive the ends of the axle 4. Upon the upper bed-plate 6 of the truck 2 is supported a truck-frame 9, which comprises a plurality of cross-bars 10 and end bars 11. The frame 9 is further provided with a bed-plate 12, which latter is provided with an opening 13, which registers with openings in the bed-plates 6, the aforesaid openings receiving a king-bolt 14, by which the frame 9 is securely positioned upon the truck. The frame 9 directly supports the body 3 of the car, the body 3 being provided with fulcrumed members 15, secured to the under side thereof, which are received between the end bars 11 of the frame 9 and which coöperate with the said frame to hold the body 3 upon the truck-body when the same is in its normal position and when inclined to effect dumping thereof. The car is adapted to be dumped by opening of an end-gate 16, which end-gate forms a part of one side of the car and is automatically operated in the dumping operation.

The several cars which comprise the conveyer are connected by chains 17 or similar means, and buffers 18 are interposed between the cars for obvious purposes. The buffers 18 may be of any ordinary type, and the cars are further supplied with coupling-rods 19, connecting same, the buffers directly coöperating with said coupling-rods. The coupling-rods are provided with the slot ends 20, through which pass coupling-rod bolts 21, the latter extending through the bed-plates 6 of the truck. Any take-up device, such as a turnbuckle 22, may be used for adjusting the coupling-rods 20, the operation of the same being obvious. The cross-bars 10 of the frame 9 rest upon the buffers 18, this mounting lending additional strength and rigidity to the truck structure, as will be apparent.

In order to prevent any of the excavated material from being thrown between the conveyer-receptacles as same is received thereby, the car-bodies are provided with deflector-hoods, which span the space between the same and cause the material to be directed into the body of the car or receptacle 3. The deflector-hoods comprise an inclined plate 23, secured to one end of each of the cars, and the other end of the car is provided with a V-shaped plate 24, which is adapted to overlap the inclined plate 23 of the next adjacent car-body 3. The bed-plates 23 and 24 when adjacent each other, as above described, secure as deflectors and extend over the space between cars 3 for this purpose.

As has been before set forth, the receptacles 3, which are carried by the cars of the conveyer, are automatically dumped at a predetermined point in their travel, and in order to effect the above operation the car-bodies 3 are adapted for a certain amount of pivotal movement with relation to the trucks 2, the fulcrumed members 15 serving as the pivot means to accomplish the above. The point of dumping of the cars has been termed the "spillway," and adjacent and extending about the length of the spillway are a number of supporting-columns 25, which support a dumping or spillway rail 26, the rail 26 gradually inclining toward and from a certain point sufficiently high to incline the car-bodies to a degree sufficient to effect the dumping operation of the material therein. The columns 25 comprise sections 27, which are secured together by a sleeve 28. The sections 27 form a tubular structure, and the lower end of each of the sections is provided with a truss-shaped member 29, adapted to embrace one of the cross-ties of the track 1, which cross-ties serve as a support for the column. In order to prevent any tendency of the sleeve 28 to move upwardly, owing to the tapered form of the column, which gives the sleeve a wedge coöperation with the sections 27, pins 30 may be forced into registering notches provided upon the meeting faces of the sections 27, said pins 30 constituting stops. A standard 31 is mounted in the upper portion of the column 26, and from the standard 31 is projected a rail-supporting extension 32, the latter being provided with a seat 33, which receives a rail-chair 34. The spillway-rail 35 is disposed upon the chairs 34 upon each of the columns 25, and the chairs 34 are secured to the extensions 32 by means of fastening-bolts 36 or the like. In order to vary the adjustment of the height of the extensions 32, which support the spillway-rail, collars 37 of different thicknesses, dependent upon the desired amount of adjustment, may be interposed between the extensions 32 and the head of the columns. The higher points in the length of the spillway-rail are the points along which the car-bodies 3 are automatically dumped, and each of the bodies 3 is provided with a pivoted supporting-bar 38 upon the side which moves upwardly, and this supporting-bar has mounted upon corresponding end portions thereof rollers 39, which are suitably journaled in position. The bar 38 is pivoted intermediate its ends by means of a pivot 40 and is adapted for a certain amount of angular adjustment necessary as the car approaches the inclined spillway-rail 26. As the car approaches the rail 26 preparatory to dumping the rollers 39 of the supporting-bar 38 ride upon the rail 26, and the body 3 of each of the cars is gradually tilted into an inclined position, as shown most clearly in Fig. 3 of the drawings. The car-body is vertically tilted, the angular disposal of the inclined portion of the spillway-rail 26 permitting of this movement because of the provision of the pivoted supporting-bar 38, which adapts itself to the inclination of the spillway-rail. When a car-body 3 has approached the maximum height under the actuation of the rail 26, the gate 16 is automatically opened to permit discharge of the contents of the receptacles or bodies 3. The automatic opening of the end-gate 16 is accomplished by means of trip-arms 41, which are projected laterally from the frame 9 of the truck. The ends of the trip-arms 41 when the car is tilted, as shown in Fig. 3, extend into openings in the bottom of the car-body 3 and engage the lock-bolts 42 upon the end-gate 16 and throw said lock-bolts, by a longitudinal movement thereof, out of the said openings, thereby unlocking the end-gate 16 and permitting discharge of the material from the car. The above operation takes place as each car reaches the extreme height of its tilted position, and as the emptied cars move from the spillway-rail same gradually assume their normal position upon the car-truck, the end-gate 16 automatically closing at the same time. The angular movement of the pivoted supporting-bar 38 of the bodies 3 is limited by stop-lugs 43, which are adapted for adjustment upon the side of the car, the adjustment being secured through the provision of a plurality of openings 45, adapted to receive the bolts by which the stop-lugs 43 are secured to the car-body. The adjustment of the stop-lugs 43 permits of causing either a gradual or quick tilting movement of the car-body in the discharge operation. In excavating certain materials it is very desirable to secure the regulation of the tilting movement of the car-body, as above described. In order to reduce the friction adjacent the openings which receive the ends of the trip-arms 41 in the tilting movement of the body 3 of each of the cars, friction-rollers 46 may be used.

It is obvious that when the car-body 3 of each of the conveyer-trucks 2 is tilted in its dumping movement, the weight of the car-body, as well as that of the material forming the contents thereof, is received entirely upon one side of the truck 2. Under ordinary conditions the above would cause the whole truck to tilt unless such movement is provided against, as is done in my construction of the conveyer. To compensate for the weight of the load upon the outside of the truck, a stop-rail 47 is utilized, which rail extends approximately the length of the spillway-rail 26, being disposed approximately beneath the said rail 26. The stop-rail 47 is supported upon arms 48, secured to standards 49, the standards 49 being likewise secured to the sleeves 28 of the columns 25. The stop-rail 47 is provided in its length with a plurality of friction-rollers 50, which directly engage the longitudinal stop-bar 51, projected from the side of the truck 2 of each of the cars. Thus when the car-bodies 3 begin to assume their tilted dumping position the stop-bar 51 engages beneath the stop-rail 47, and this rail coöperates with the truck 2 to prevent any upward movement thereof under the influence of the weight of the car-body at the opposite side of the truck.

Any suitable brake mechanism may be employed in connection with the conveyer for regulating the speed thereof, dependent upon the amount of material being fed thereto. A type of brake means which may be used is shown in Fig. 10 and consists of longitudinal brake-levers 52, disposed upon opposite sides of the track 1, which levers are pivoted at one end, as shown at 53, and are adapted to engage the wheels of the trucks of the cars in the braking operation. The means for operating the levers 53 into contact with the truck-wheels 5 consists of an operating-lever 54, connected to each of the levers 52 by means of connecting-bars 55, which under actuation of the lever 54 effect a simultaneous movement of the truck-levers 52 to cause engagement of the same with the wheels of the trucks. The lever 54 may be manually or power operated, preferably the latter.

Reciting the operation of the conveyer, as the material is fed into the receptacles 3 the weight of the cars starts the conveyer because of the inclined disposal thereof. As the cars approach the spillway, which may be upon the mountain side if the cut is being made through mountainous country, the same gradually tilt under the influence of the spillway-rail 26, the stop-rail 47 at the same time engaging the truck to prevent tilting movement of the same. The car-bodies 3 when in their uppermost position are automatically discharged and when emptied gradually assume their normal positions upon the car-truck, moving toward the receiving-chutes of the excavating-machines. The mounting of the trucks and the connecting means therefor is essentially advantageous in permitting of the flexible movement of the cars of the conveyer when moving up and down inclines of the spillway-rail 26.

It will be understood that the various details of the structure as embodied in the description and drawings may be modified and changed in accordance with the broad spirit of the invention and the scope of the claims appended.

Having thus described the invention, what is claimed as new is—

1. In a conveyer, in combination, moving trucks or supports, receptacles movable independently of and mounted upon said supports or trucks, means for automatically tilting the receptacles while moving, and means coöperating with the bodies of the moving trucks or supports during their travel to prevent tilting thereof during the tilting movement of the receptacles.

2. In a conveyer, the combination with a plurality of moving trucks or supports, receptacles adapted to be tilted toward one side of the trucks or supports, means engaging the other side of the trucks or supports to prevent tilting of same, and means for tilting the receptacles while in movement to discharge the material therefrom.

3. In a conveyer, the combination with a traveling supporting-truck or support, a receptacle mounted upon the truck or support and adapted for tilting movement independent of and toward one side thereof, means for effecting the tilting movement of the receptacle, and an engaging rail coöperating with the body of the truck or support for preventing tilting of the supporting-truck on tilting movement of the receptacle.

4. In a conveyer, the combination of a track or way, a traveling supporting-truck or support moving upon said track or way, a receptacle independently mounted upon the truck or support and adapted for tilting movement toward one side thereof, means for effecting the tilting movement of the receptacle, and a stop-rail engaging the supporting-truck on tilting movement of the receptacle.

5. In a conveyer, the combination with a series of connected moving trucks or supports, receptacles mounted upon said supports and movable independently thereof, and superposed tilting and stop rails engaging the receptacles and the trucks or supports, respectively.

6. In a conveyer, the combination with a series of moving trucks or supports, receptacles mounted upon said supports and adapted for tilting movement toward one side of the respective supports, a tilting-rail adapted to engage the receptacles to effect tilting movement thereof, and engaging means coöperating with the trucks or supports when the receptacles are tilted, said engaging means preventing tilting movement of the said trucks or supports.

7. In a conveyer, the combination with a plurality of flexibly-connected trucks or supports, receptacles mounted upon said supports and movable independent thereof, a tilting-rail engaging the receptacles at a predetermined point in their movement to effect discharge of the contents thereof, and a stop-rail engaging the trucks or supports to prevent tilting thereof during the discharge movement of the receptacles.

8. In a conveyer, the combination with a moving truck or support, a receptacle movably mounted thereon, a spillway-rail coöperating with said receptacle at a predetermined point in its movement to tilt same, and a movable supporting-bar carried by the receptacle and coöperating with the spillway-rail to effect the tilting of the receptacle.

9. In a conveyer, the combination with a moving truck or support, a receptacle mounted upon said truck or support, a spillway-rail engaging said receptacle at a predetermined point in its travel to tilt same, and a pivoted supporting-bar carried by the receptacle and coöperating with the spillway-rail in the tilting movement of the receptacle.

10. In a conveyer, the combination with a plurality of connected trucks or supports, receptacles movably mounted upon said supports, a spillway-rail, and bars pivoted between their ends and carried by the respective receptacles, engaging the spillway-rail in tilting movement of the receptacles.

11. In a conveyer, the combination with a plurality of connected moving trucks or supports, receptacles movably mounted upon said supports, a spillway-rail, each of said receptacles being provided with a bar pivoted between its ends engaging the spillway-rail in tilting movement of the receptacles, and rollers carried by the ends of the engaging bar of the receptacles.

12. In a conveyer, the combination with a moving truck or support, a receptacle mounted for tilting movement upon said support, an inclined spillway-rail, a supporting-bar pivoted between its ends to the receptacle and coöperating with the spillway-rail in tilting movement of the said receptacle, a stop-rail disposed adjacent the spillway-rail, and an engaging bar projected from the truck or support and coöperating with the stop-rail aforesaid.

13. In a conveyer, the combination with a plurality of moving trucks or supports, receptacles mounted upon said trucks or supports, an inclined spillway-rail, a supporting-bar pivoted to each of the respective receptacles, rollers carried by said supporting-bar and engaging the spillway-rail to effect tilting movement of the receptacle, a stop-rail adjacent the spillway-rail, an engaging bar projected from each of the respective trucks or supports and coöperating with the stop-rail, and friction-rollers interposed between the stop-rail and the engaging bar of each of the trucks or supports.

14. In a conveyer, the combination with a plurality of moving trucks or supports, receptacles mounted upon said trucks or supports, a spillway-rail, a supporting-bar movably mounted upon each receptacle for coöperation with the spillway-rail, and stop members projected from each of said receptacles and engaging the supporting-bar thereof for the purpose set forth.

15. In a conveyer, the combination with a plurality of moving trucks or supports, receptacles mounted upon said trucks or supports and adapted to be tilted toward one side thereof, a spillway-rail, a movable supporting-bar pivoted to each of the receptacles and adapted to engage the spillway-rail to effect tilting of the said receptacles, and adjustable stop-lugs projected from each receptacle and adapted to engage the ends of the supporting-bar thereof to regulate the movement of the latter.

16. In a conveyer, the combination with a moving truck or support, a receptacle mounted thereon and adapted to be tilted toward one side of said truck or support, and means other than the spillway-rail for varying the tilting movement of the receptacle.

17. In a conveyer, the combination with a moving truck or support, a receptacle pivotally mounted thereon and adapted to be tilted toward one side thereof, a spillway-rail, and an adjustable member carried by the receptacle for coöperation with the spillway-rail to regulate the tilting of the receptacle.

18. In a conveyer, the combination with a moving truck or support, movable receptacles mounted upon said truck or support, columns disposed adjacent the path of movement of the truck or support, an inclined spillway-rail supported by said columns, a stop-rail supported by said columns, engaging means between the truck and the stop-rail, and engaging means between the receptacle and the spillway-rail to effect tilting of the receptacle at a predetermined point in its travel.

19. In a conveyer, the combination with a plurality of moving trucks, receptacles movably mounted upon said trucks, columns arranged adjacent the path of movement of the trucks, standards projected from the columns, an inclined spillway-rail mounted upon corresponding standards of the columns, a stop-rail carried by other corresponding standards of the columns, pivoted supporting-bars carried by the receptacles, rollers mounted upon the ends of said supporting-bars and adapted to ride into engagement with the inclined spillway-rail, and an engaging member projected from each of the trucks and coöperating with the stop-rail to prevent tilting of the said trucks.

20. In a conveyer, the combination with a moving truck, a receptacle movably mounted upon said truck, a spillway-rail, a supporting-bar pivoted to the receptacle aforesaid, engaging means carried by said supporting-bar for coöperation with the spillway-rail, and means for limiting the pivotal movement of the supporting-bar aforesaid.

21. In a conveyer, the combination with a moving support or truck, a receptacle mounted for tilting movement upon said support or truck, an inclined spillway-rail, a supporting-bar pivoted between its ends to the receptacle aforesaid, engaging means between the said supporting-bar and the spillway-rail, and adjustable stop means limiting the movement of the supporting-bar.

In testimony whereof I affix my signature in presence of two witnesses.

ORLANDO KLING. [L. S.]

Witnesses:
LEWIS M. MCBRIDE,
WESLEY H. WIGHTMAN.